United States Patent
Yi et al.

(10) Patent No.: US 11,221,273 B2
(45) Date of Patent: Jan. 11, 2022

(54) METHOD FOR AUTOMATICALLY DETECTING FREE VIBRATION RESPONSE OF HIGH-SPEED RAILWAY BRIDGE FOR MODAL IDENTIFICATION

(71) Applicant: Dalian University of Technology, Dalian (CN)

(72) Inventors: Tinghua Yi, Dalian (CN); Xiaomei Yang, Dalian (CN); Chunxu Qu, Dalian (CN); Hongnan Li, Dalian (CN)

(73) Assignee: Dalian University of Technology, Dalian (CN)

( * ) Notice: Subject to any disclaimer, the term of this patent is extended or adjusted under 35 U.S.C. 154(b) by 391 days.

(21) Appl. No.: 16/479,730

(22) PCT Filed: Mar. 1, 2019

(86) PCT No.: PCT/CN2019/076604
§ 371 (c)(1),
(2) Date: Jul. 22, 2019

(87) PCT Pub. No.: WO2020/168589
PCT Pub. Date: Aug. 27, 2020

(65) Prior Publication Data
US 2020/0284687 A1 Sep. 10, 2020

(30) Foreign Application Priority Data
Feb. 19, 2019 (CN) .......................... 201910120922.9

(51) Int. Cl.
*G01M 7/02* (2006.01)
*G01H 17/00* (2006.01)

(52) U.S. Cl.
CPC ............ *G01M 7/025* (2013.01); *G01H 17/00* (2013.01)

(58) Field of Classification Search
CPC ........ G01M 7/025; G01M 7/02; G01H 17/00; G01H 1/06
See application file for complete search history.

(56) References Cited

U.S. PATENT DOCUMENTS 5,327,358 A * 7/1994 Stubbs ................... G01H 17/00
702/36
6,192,758 B1 * 2/2001 Huang .................. G01M 7/022
73/579

(Continued)

FOREIGN PATENT DOCUMENTS

CN 101706355 A 5/2010
CN 105865735 A 8/2016

(Continued)

OTHER PUBLICATIONS

Zhang, Rapid bridge testing and estimation method based on change of time-varying dynamic characteristics of axle coupling system, Filing Year: 2018, CN109357822A (Year: 2018).*

(Continued)

*Primary Examiner* — Raul J Rios Russo
*Assistant Examiner* — Carl F. R. Tchatchouang
(74) *Attorney, Agent, or Firm* — Muncy, Geissler, Olds & Lowe, P.C.

(57) ABSTRACT

A method for automatically detecting the free vibration response segment of the high-speed railway bridges after trains passing. First, pre-select the test response sequence to be decomposed based on the maximum of the time instants corresponding to the absolute maximums of the response vectors at various measuring point. Then, Extract the single-frequency modal response from the test response by the iterative variational mode decomposition and fit the envelope amplitude of the modal response by Hilbert transform. Finally, the vibration features at each time instants are marked as decay vibration or non-decay vibration. The (Continued)

longest structural response segment that meets the decay vibration features is determined as the detected free vibration response segment for modal identification. This invention can effectively detect the free vibration data segment without human participation, which is of great significance for the real-time accurate modal analysis of high-speed railway bridges.

1 Claim, 2 Drawing Sheets

(56) References Cited

U.S. PATENT DOCUMENTS

| | | | | |
|---|---|---|---|---|
| 10,228,278 B2* | 3/2019 | Chen | ............ | G01H 1/00 |
| 11,003,738 B2* | 5/2021 | Yi | ............ | G06F 30/20 |
| 2007/0163351 A1* | 7/2007 | Wu | ............ | G01H 17/00 |
| | | | | 73/649 |
| 2017/0176244 A1* | 6/2017 | Fujita | ............ | G01M 7/06 |

FOREIGN PATENT DOCUMENTS

| | | | |
|---|---|---|---|
| CN | 106446829 A | | 2/2017 |
| CN | 107505652 A | | 12/2017 |
| CN | 109357822 | * | 8/2018 |
| JP | 2016194442 A | | 11/2016 |
| TW | 201009305 A | | 3/2010 |
| WO | WO-2015195728 A1 | | 12/2015 |

OTHER PUBLICATIONS

Pinghe Ni, "Time-Varying System Identification Using Variational Mode Decomposition," Structural Control and Health Monitoring, p. 1-20, Jun. 30, 2018.

Abdollah Bagheri, "Structural System Identification Based on Variational Mode Decomposition," Journal of Sound and Vibration, vol. 417, p. 182-197, Mar. 17, 2018.

J.M. Caicedo, "Practical Guidelines for the Natural Excitation Technique (NExT) and the Eigensystem Realization Algorithm (ERA) for Modal Identification Using Ambient Vibration" Experimental Techniques, vol. 35, p. 52-58, Jul. 26, 2011.

Chen Chen, "Application of variational mode decomposition in power system harmonic detection," Power System Protection and Control, vol. 46, No. 14, p. 1-8, Jul. 16, 2018, with English language abstract on p. 1.

* cited by examiner

METHOD FOR AUTOMATICALLY DETECTING FREE VIBRATION RESPONSE OF HIGH-SPEED RAILWAY BRIDGE FOR MODAL IDENTIFICATION

TECHNICAL FIELD

The presented invention belongs to the field of structural health monitoring, and relates to a method for automatically detecting a free vibration response of a high-speed railway bridge after a train passing which can be applied in engineering structure modal identification.

BACKGROUND

In the structural health monitoring of bridges, evaluating the structural overall state of the based on real-time changes in modal parameters is a feasible idea. But the bridges in practice are subject to complex and ever-changing load, extracting the structural modal parameters accurately is difficult. The commonly used modal parameter identification methods, such as the stochastic subspace method, the natural excitation technology combined with the eigensystem realization algorithm, are stable and reliable but require the excitation subject to Gauss stationary white noise characteristics. Some novel time-frequency modal identification methods, such as Hilbert-Huang transform and continuous wavelet transform, can solve the non-stationary excitation to some extent, but there are also some problems in practical application, such as the difficult determination of the algorithm parameters and the unsatisfactory effect of the modal separation. In the previous modal analysis of bridge structures, it is generally analyzed by selecting a long-time vibration response sequence to ensure that the environmental excitation (including wind load, train load, etc.) has asymptotically stationary characteristics. But the longer the vibration response time, the lower the computational efficiency of the identification algorithm. In addition, the change of ambient temperature will cause the change of material properties and restraint internal forces of bridge structures, which will be reflected as the slow time-varying characteristics of structural modes. The modal parameters solved by the long time vibration response sequence can not effectively show the slow time-varying characteristics of the structure. Therefore, a method of modal identification based on the short-time response sequence is needed. An excellent vibration characteristic of high-speed railway bridges is that the short time vibration response after a train passing is a free vibration response with only the dynamic characteristics of the structure retained. Because of the large vibration amplitude caused by the strong impact force of the vehicle load, the high signal-to-noise ratio of the free vibration response after a train passing will be led to. Meanwhile, when the short time vibration response is used for modal identification, the structural characteristics will not change. Thus, the free vibration response data segment can be used to identify modal parameters with high accuracy under low computational burden. However, the forced vibration response of the train passing through the bridge has serious non-stationary characteristics. If the forced vibration components are mixed into the free vibration data segment, the accuracy of modal parameter identification will be reduced. Therefore, it is necessary to detect the free vibration data segment accurately. The traditional detection method based on manual selection is not suitable for long-term real-time extraction of modal parameters. In addition, it is difficult to accurately distinguish the forced vibration responses from the free vibration responses depending on the recorded vehicle information due to the short time of vehicle passing through the bridge. Therefore, it is of great engineering significance to develop a method for automatically detecting the free vibration response data after a train passing.

SUMMARY

The objective of the presented invention is to provide an automatic method for detecting the free vibration data segment of the bridge structures, which can solve the problems that the large artificial workload and the unsatisfactory accuracy in modal parameter identification by the free vibration responses of high-speed railway bridges after the train passing.

The technical solution of the present invention is as follows:

A method for automatically detecting the free vibration response segment of the high-speed railway bridge after the train passing is proposed. The test response to be decomposed is pre-selected based on the maximum of the time instants corresponding to the absolute maximum value of the response vector at each measuring point. Then the iterative variational modal decomposition is used to decompose the test response to obtain the single-degree-of-freedom modal response. Further, the instantaneous envelope difference of the modal response is taken as the characteristic of the structural response at each time instant. According to the characteristic that the envelope amplitude of the single-degree-of-freedom free vibration modal response is decreasing, the structural response corresponding to the negative instantaneous envelope difference is marked as the decay vibration and the longest decay vibration sequence is determined as the free vibration response segment. Finally, the determined free vibration response segment is utilized in the eigensystem realization algorithm for modal identification to verify the feasibility of the proposed method.

The procedures of automatically detecting the structural free vibration response data segment are as follows:

Step 1: Pre-selection of the test response to be decomposed.

The acceleration responses at different measuring points are given as $y(t)=[y_1(t),y_2(t),\ldots,y_s(t)]^T, t=\Delta t, 2\Delta t,\ldots,N\Delta t$, where $\Delta t$ is the sampling time interval; N is the number of samples; s is the number of measuring points and the superscript T indicates transposition.

Calculate the time instant corresponding to the absolute maximum value of the response vector at each measuring point i (i=1,2, . . . ,s) as $$t_i = \arg\max_{\Delta t \leq t \leq N\Delta t} |y_i(t)|.$$

Then the measuring point corresponding to the maximum of the time instants $t_i$ (i=1,2, . . . ,s) is obtained as $$h = \arg\max_{1 \leq i \leq s} |t_i|,$$

where || represents the absolute value. Then the response sequence $y_h(t_h)$, $t=t_h, t_h+\Delta t, \ldots, N\Delta t$ is taken as the test response to be decomposed.

Step 2: Extraction of modal response.

Decompose the pre-selected test response by variational mode decomposition with the component number of 2 to obtain the modal response, as follows:

$$\min_{\{y_{h,q}\},\{\omega_q\}} \left\{ \sum_{q=1}^{2} \left\| \partial_t \left[ \left( \delta(t) + \frac{j}{\pi t} \right) * y_{h,q}(t) \right] e^{-i\omega_q t} \right\|_2^2 \right\} \text{ s.t. } \sum_{q=1}^{2} y_{h,q}(t) = y_h(t) \quad (1)$$

where $\delta$ means the Dirichlet function; j is the imaginary unit; $\partial_t$ represents the gradient function with respect to t; e is the Euler number; $\pi$ is the circumference ratio; $\|\cdot\|_2$ denotes the 2-norm of a vector; * represents the convolution; $\omega_q$ is the central angular frequency of the component $y_{h,q}(t)$; $y_{h,q}(t)$ is the q(q=1,2) component decomposed from the test response $y_h(t)$.

Decompose the test responses $y_h(t)$ into two components $y_{h,1}^{[1]}(t)$ and $y_{h,2}^{[1]}(t)$. Then calculate the difference of the central angular frequencies as $\Delta\omega^{[1]}=|\Delta_1^{[1]}-\omega_2^{[1]}|$. If the angular frequency difference is greater than 0.01 times of the fundamental frequency of the structure, i.e., $\Delta\omega^{[1]}>2\pi f_{min}/100$, calculate the component energy as $$e_q^{[1]} = \sum_t (y_{h,q}^{[1]}(t))^2,$$

(q=1,2) and the component $y_{h,\tilde{q}}^{[1]}(t)$, $$\tilde{q} = \arg\max_{q=1,2} |e_q^{[1]}|$$

with higher energy are updated as the test signal to be decomposed. Then the variational mode decomposition is used again to decompose the component $y_{h,\tilde{q}}^{[1]}(t)$. The above process will be repeated r times until the angular frequency difference of two components after the r-th decomposition satisfies $\Delta\omega^{[r]} \leq 2\pi f_{min}/100$, which means that the two components are with the identical frequency. The component $y_{h,\tilde{q}}^{[1]}(t)$ which has larger energy is deemed as the modal response with the angular frequency $\omega\tilde{q}^{[r]}$, labelled as $x(t)=_{\tilde{q}}^{[r]}(t)$.

Step 3: Estimation of Free Vibration Response

Extend the modal response $x(t)$ as $x_e(t)$, and the Hilbert transform is performed on the continuation modal response $x_e(t)$ to obtain its envelope amplitude $a_e(t)$ as:

$$a_e(t) = \sqrt{(x_e(t))^2 + \left(\frac{1}{\pi t} * x_e(t)\right)^2} \quad (2)$$

The envelope a(t) corresponding to the modal response x(t) is intercepted from the envelope $a_e(t)$ of the continuation modal response $x_e(t)$, and the instantaneous amplitude difference is calculated as $\Delta a(t)=a(t+1)-a(t)$. According to the characteristic that the envelope amplitude of the free vibration modal response is decreasing, the vibration feature corresponding to the time instants of $\Delta a(t) \leq 0$ is marked as "decay vibration" and expressed in 1. Otherwise, if $\Delta a(t)>0$, the vibration feature is marked as "non-decay vibration" and expressed in 0. Thus, the vibration feature from the selected time instants $t=[t_h, t_h+\Delta t, \ldots, N\Delta t]$ will be labelled as a set of 0 or 1. Choose the time instants $[t_h+w\Delta t, t_h+(w+1)\Delta t, \ldots, t_h+\kappa\Delta t]$ corresponding to the longest vibration feature sequence which are continuously marked as 1. And extract the structural vibration responses y(t), $t=t_h+w\Delta t, \ldots, t_h+\kappa\Delta t$ as the free vibration response segment $\tilde{y}(k)$, k=1,2,...κ−w+1. A simple example as: For the sequence [0,1,1,0,1,0,0,1,1,1,1,1], the longest sub-sequence [1,1,1,1,1] appears at the position of the w=8 element to the κ=12 element which are in correspondence with the time instants $t=[t_h+8\Delta t, \ldots, t_h+12\Delta t]$. Then the free vibration responses are y(t), $t=t_h+8\Delta t, \ldots, t_h+12\Delta t$.

Step 4: Identification of Modal Parameters

Eigensystem realization algorithm with data correlation is used to identify modal parameters. First, construct the Hankel matrix H(k) by the obtained free vibration responses $\tilde{y}(k)$ as $$H(k) = \begin{bmatrix} \tilde{y}(k+1) & \tilde{y}(k+2) & \ldots & \tilde{y}(k+g) \\ \tilde{y}(k+2) & \tilde{y}(k+3) & \ldots & \tilde{y}(k+g+1) \\ \vdots & \vdots & \ddots & \vdots \\ \tilde{y}(k+l) & \tilde{y}(k+l+1) & \ldots & \tilde{y}(k+g+l-1) \end{bmatrix} \quad (3)$$

Then build the correlation function matrix $S=H(1)(0)^T$ by the Hankel matrix. Implement eigensystem realization algorithm for the correlation function matrix to solve the modal parameters, including the structural frequency, the damping ratio and the mode shape vector.

The advantage of the invention is that the free vibration data segment is separated from the vibration responses of the high-speed railway bridges by means of the amplitude decreasing characteristic of the modal response, which can calculate modal parameters with low computational burden and high precision. Meanwhile, to avoid introducing the empirical parameters into the free vibration detection which will hinder the real-time modal analysis, the iterative variational mode decomposition is adopted to extract modal responses, so as to automatically detect the free vibration segment.

DETAILED DESCRIPTION

The present invention is further described below in combination with the technical solution.

Figure 1:
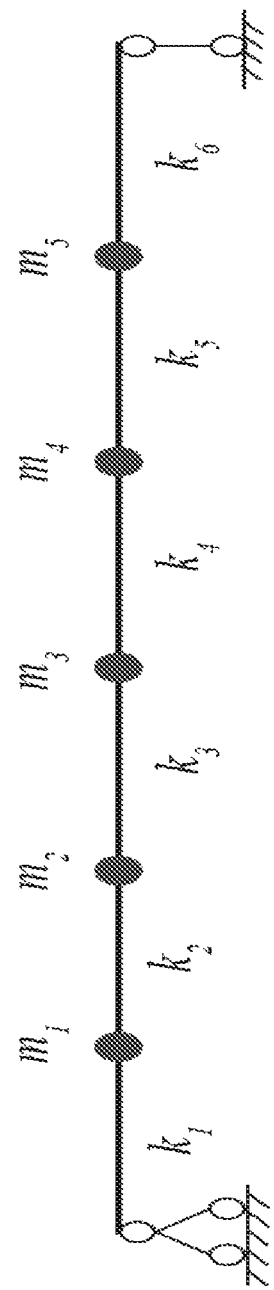
FIG. 1 presents the numerical example model.

The numerical example of a simply supported beam model is employed, as shown in FIG. 1. The length of each element is 10 m. Based on the idea of static condensation, only the vertical displacement of the structure is considered and the torsional displacement is ignored. The element stiffness after static condensation is $k_1=k_2=k_3=k_4=k_5=k_6=100$ N/m. The mass is $m_1=m_2=m_3=m_4=m_5=1.5$ kg. Rayleigh damping is adopted with the mass matrix coefficient $\alpha=0.0446$ and the stiffness matrix coefficient $\beta=0.0013$. The constant loads $F_1(t)=F_2(t)=2\times10^3$ with the spatial interval of 0.05 m move from the left to the right of the beam at a speed of 1 m/s. The 175 s acceleration responses at each node position are collected at a sampling frequency of 20 Hz.

The procedures are described as follows:

The acceleration responses collected at each measuring point is given as $y(t)=[y_1(t),y_2(t),\ldots,y_s(t)]^T$, where the sampling time interval is $\Delta t=1/f_s=0.05$; the number of samples is $N=3501$; the number of measuring points is $s=5$.

Calculate the time instant corresponding to the absolute maximum of the response vector at each measuring point i (i=1,2,...,s) as $$t_i = \arg\max_{\Delta t \le t \le N\Delta t} |y_i(t)|.$$

Then the measuring point corresponding to the maximum of the time instants $t_i$, i=1,2,...,5, is obtained by $$h = \arg\max_{1\le i\le s} |t_i|$$

as h=1 with $t_h=t_1=1022\ \Delta t=51.1$. Then the response sequence $y_1(t), t=t_1,\ldots,N\Delta t$ is taken as the test response to be decomposed.

Figure 2:
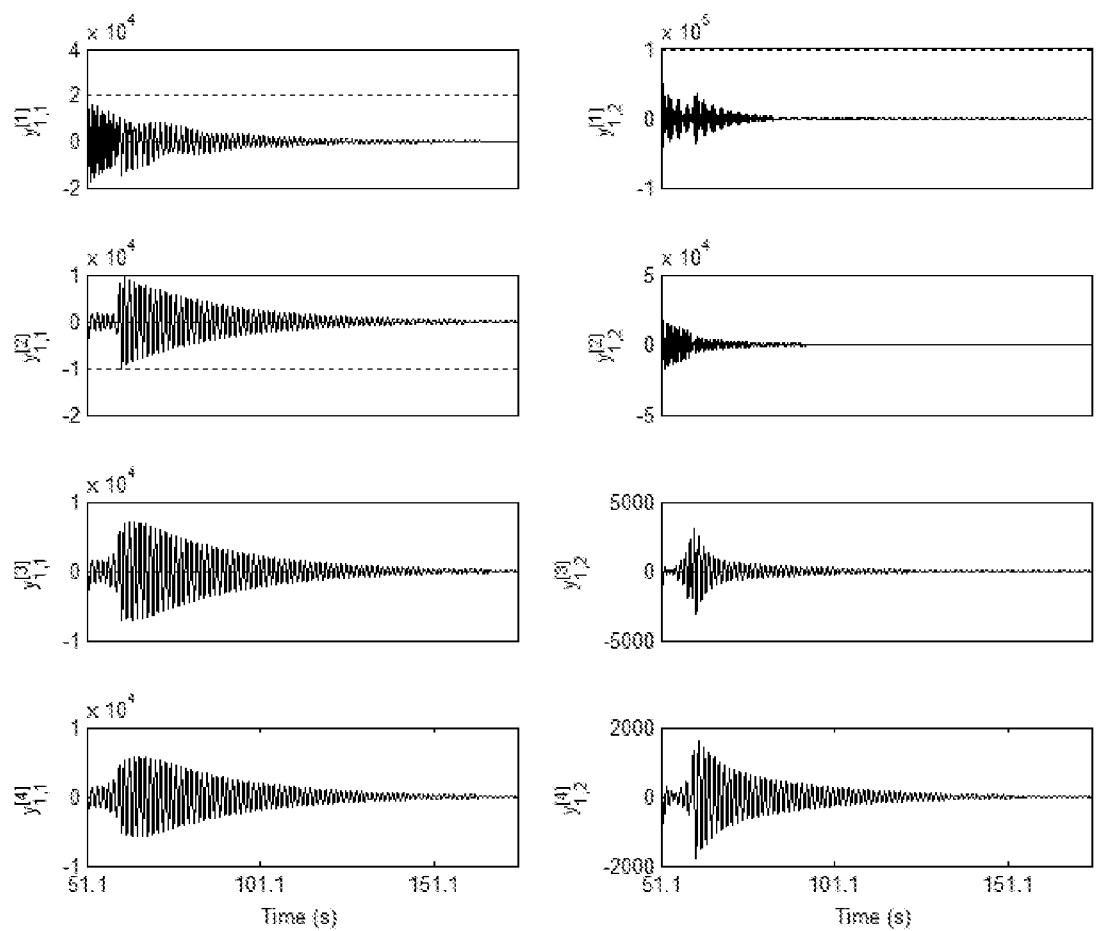
FIG. 2 shows the extraction process of modal responses by iterative mode decomposition.

The test response $y_1(t)$ is decomposed by the variational mode decomposition in Eq. (1) where the number of components is fixed as 2. After the first decomposition, two components $y_{1,1}^{[1]}(t)$ and $y_{1,2}^{[1]}(t)$ with the central angular frequencies $\omega_1^{[1]}$ and $\omega_2^{[1]}$ are obtained, as shown in FIG. 2. The fundamental frequency is determined as $f_{min}=0.6727$ Hz in accordance with the power spectrum of the vibration responses. Since $\Delta\omega^{[1]}>2\pi f_{min}/100$, the energy of each component is calculated as $$e_1^{[1]} = \sum_t (y_{1,1}^{[1]}(t))^2 \text{ and } e_2^{[1]} = \sum_t (y_{1,2}^{[1]}(t))^2.$$

Since $e_1^{[1]}>e_2^{[1]}$, the component $y_{1,1}^{[1]}(t)$ is considered as the new test signal to be decomposed by the variational mode decomposition. Repeat the above process until the angular frequency difference $\Delta\omega^{[4]}=|\omega_1^{[4]}-\omega_2^{[4]}|<2\pi f_{min}/100$. Since $e_1^{[4]}>e_2^{[4]}$, the component $y_{1,1}^{[4]}(t)$ is selected as the modal response, which will be labelled as $x(t)\equiv y_{1,1}^{[4]}(t)$.

Extend the modal response x(t) to obtain the continuation signal $x_e(t)$ to avoid the edge effect in the subsequent transform. Then the Hilbert transform is used to obtain the envelope amplitude of the continuation signal $x_e(t)$ as $a_e(t)$, as Eq. (2).

Figure 3:
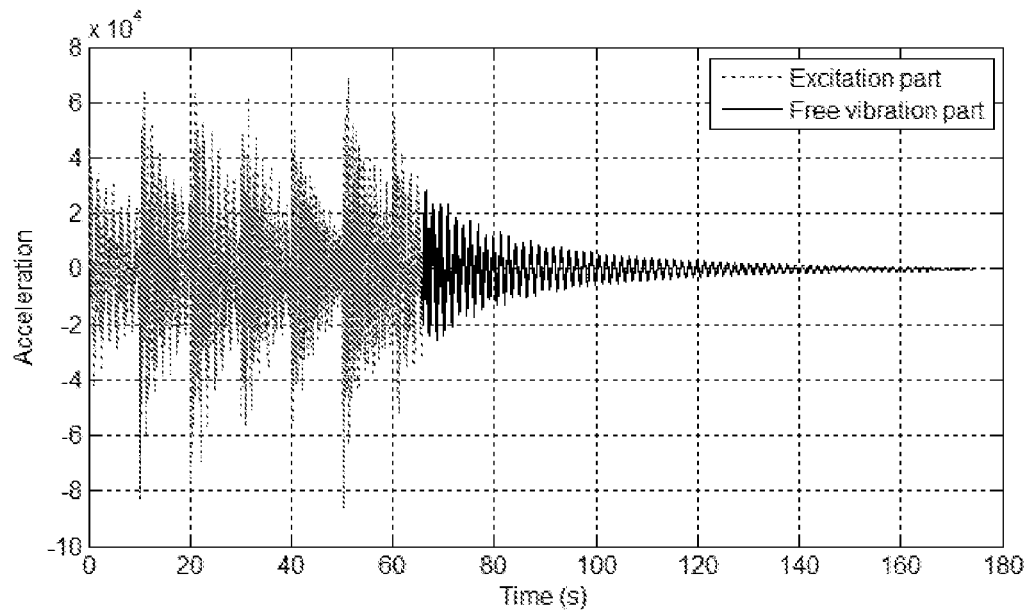
FIG. 3 presents the detected free vibration data segment.

The envelope a(t) corresponding to the modal response x(t) is intercepted from the envelope $a_e(t)$ of the continuation modal response $x_e(t)$, and the instantaneous amplitude difference is calculated as $\Delta a(t)=a(t+1)-a(t)$. According to the characteristic that the envelope amplitude of the free vibration modal response is decreasing, the vibration feature corresponding to the time instants of $\Delta a(t)\le 0$ is marked as "decay vibration" and expressed in 1. Otherwise, if $\Delta a(t)>0$, the vibration feature is marked as "non-decay vibration" and expressed in 0. Thus, the vibration feature from the selected time instants $t=[t_h,t_h+\Delta t,\ldots,N\Delta t]$ will be labelled as a set of 0 or 1. Choose the time instants $[t_h+w\Delta t, t_h+(w+1)\Delta t, \ldots, t_h+\kappa\Delta t]$ corresponding to the longest vibration feature sequence which are continuously marked as 1. And extract the structural vibration responses y(t), $t=t_h+w\Delta t,\ldots,t_h+\kappa\Delta t$ as the free vibration response segment $\tilde{y}(k)$, $k=1,2,\ldots\kappa-w+1$, as shown in FIG. 3.

The eigensystem realization algorithm with data correlation is performed on the detected free vibration response segment. First, the obtained free vibration responses are utilized to construct the Hankel matrix H(k) as Eq. (3). Set k=l=30, $g=N_b-2\ l+1$, and build the correlation function matrix as $S=H(l)H(0)^T$. Implement eigensystem realization algorithm for the correlation function matrix to solve the first 5 modal parameters of the structure, which are consistent with the numerical solution. The identified frequencies are $f_1=0.6727$ Hz, $f_2=1.2995$ Hz, $f_3=1.8378$ Hz, $f_4=2.2508$ Hz, $f_5=2.5104$ Hz and the identified damping ratios are $d_1=0.8000\%$, $d_2=0.8000\%$, $d_3=0.9384\%$, $d_4=1.0706\%$, $d_5=1.1596\%$. As a comparison, the vibration responses corresponding to the time instants $t=t_h,\ldots,N\Delta t$ are implemented into the eigensystem realization algorithm to solve the first 5 modal parameters, which are a little dissimilarity with the numerical solution. The estimated frequencies are $f'_1=0.6712$ Hz, $f'2=1.2963$ Hz, $f'_3=1.8413$ Hz, $f'_4=2.2513$ Hz, $f'_5=2.5132$ Hz. The estimated damping ratios are $d'_1=0.7621\%$, $d'_2=2.1911\%$, $d'_3=0.6523\%$, $d'_4=0.8205\%$, $d'_5=1.3894\%$.

The invention claimed is:

1. A method for automatically detecting free vibration response of high-speed railway bridge for modal identification, wherein steps are as follows: step 1: pre-selection of a test response to be decomposed an acceleration responses at different measuring points are given as $y(t)=[y_1(t), y_2(t),\ldots,y_s(t)]^T, t=\Delta t, 2\Delta t,\ldots,N\Delta y$, where $\Delta t$ is the sampling time interval; N is the number of samples; s is the number of measuring points and the superscript indicates transposition;

calculate a time instant corresponding to an absolute maximum value of a response vector at each measuring point i, i=1,2,...,s, as $$t_i = \arg\max_{\Delta t \le t \le N\Delta t} |y_i(t)|;$$

then the measuring point corresponding to a maximum of the time instants t, =1,2,...,s, is obtained as $$h = \arg\max_{1\le i\le s} |t_i|,$$

where $\|$ represents the absolute value; then a response sequence $y_h(t_h)$, $t=t_h, t_h+\Delta t, \ldots, N\Delta t$ is taken as the test response to be decomposed;

step 2: extraction of modal response decompose the pre-selected test response by variational mode decomposition with the component number of 2 to obtain the modal response, as follows:

$$\min_{\{y_{h,q}\},\{\omega_q\}} \left\{ \sum_{q=1}^{2} \left\| \partial_t \left[ \left(\delta(t) + \frac{j}{\pi t}\right) * y_{h,q}(t) \right] e^{-i\omega_q t} \right\|_2^2 \right\} \text{ s.t. } \sum_{q=1}^{2} y_{h,q}(t) = y_h(t) \quad (1)$$

where $\delta$ means the Dirichlet function; j is the imaginary unit; $\partial_t$ represents the gradient function with respect to t; e is the Euler number; $\pi$ is the circumference ratio; $\|\ \|_2$ denotes the 2-norm of a vector; * represents the convolution; $\omega_q$ is the central angular frequency of the component $y_{h,q}(t)$; $y_{h,q}(t)$ is the q (q=1,2) component decomposed from the test response $y_h(t)$;

decompose the test responses $y_h(t)$ into two components $yh^{[1]}_{h,1}(t)$ and $y^{[1]}_{h,2}(t)$; then calculate the difference of the central angular frequencies as $\Delta\omega^{[1]}=|\omega^{[1]}_{h,1}-\omega^{[1]}_2|$; if an angular frequency difference is greater than 0.01 times of a fundamental frequency of a structure, wherein, $\Delta\omega^{[1]}>2\pi f_{min}/100$, calculate the component energy as $$e_q^{[1]} = \sum_t (y_{h,q}^{[1]}(t))^2,$$  (1)

(q=1,2) and the component $y_{h,\tilde{q}}^{[1]}(t)$, $$\tilde{q} = \arg\max_{q=1,2} |e_q^{[1]}|$$

with higher energy are updated as a test signal to be decomposed; then the variational mode decomposition is used again to decompose the component $y_{h,\tilde{q}}^{[1]}(t)$; the above process will be repeated r times until the angular frequency difference of two components after the r-th decomposition satisfies $\Delta\omega^{[r]}>2\pi f_{min}/100$, which means that the two components are with the identical frequency; the component $y_{h,\tilde{q}}^{[1]}(t)$ which has larger energy is deemed as the modal response with the angular frequency $\omega_{\tilde{q}}^{[1]}$, labelled as $x(t)=y_{\tilde{q}}^{[r]}(t)$ Step 3: estimation of free vibration response extend the modal response $x(t)$ as $x_e(t)$, and the Hilbert transform is performed on a continuation modal response $x_e(t)$ to obtain its envelope amplitude $a_e(t)$ as:

$$a_e(t) = \sqrt{(x_e(t))^2 + \left(\frac{1}{\pi t} * x_e(t)\right)^2}$$  (2)

the envelope $a(t)$ corresponding to the modal response $x(t)$ is intercepted from the envelope $a_e(t)$ of the continuation modal response $x_e(t)$, and an instantaneous amplitude difference is calculated as $\Delta a(t)=a(t+1)-a(t)$; according to a characteristic that the envelope amplitude of the free vibration modal response is decreasing, a vibration feature corresponding to the time instants of $\Delta a(t)\leq 0$ is marked as "decay vibration" and expressed in 1; otherwise, if $\Delta a(t)>0$, the vibration feature is marked as "non-decay vibration" and expressed in 0; thus, the vibration feature from the selected time instants $t=[t_h,t_h+\Delta t,\ldots,N\Delta t]$ will be labelled as a set of 0 or 1; choose the time instants $[t_h+w\Delta t,t_h+(w+1)\Delta t,\ldots,t_h+\kappa\Delta t]$ corresponding to a longest vibration feature sequence which are continuously marked as 1; and extract a structural vibration responses $y(t)$, $t=t_h+w\Delta t,\ldots,t_h+\kappa\Delta t$ as the free vibration response segment $\tilde{y}(k)$, $k=1,2,\ldots\kappa-w+1$;

step 4: identification of modal parameters eigensystem realization algorithm with data correlation is used to identify modal parameters; first, construct the Hankel matrix $H(k)$ by the obtained free vibration responses $\tilde{y}(k)$ as:

$$H(k) = \begin{bmatrix} \tilde{y}(k+1) & \tilde{y}(k+2) & \ldots & \tilde{y}(k+g) \\ \tilde{y}(k+2) & \tilde{y}(k+3) & \ldots & \tilde{y}(k+g+1) \\ \vdots & \vdots & \ddots & \vdots \\ \tilde{y}(k+l) & \tilde{y}(k+l+1) & \ldots & \tilde{y}(k+g+l-1) \end{bmatrix}$$  (3)

then build the correlation function matrix $S=H(1)H(0)^T$ by the Hankel matrix; implement eigensystem realization algorithm for the correlation function matrix to solve the modal parameters, including a structural frequency, a damping ratio and a mode shape vector.

* * * * *